United States Patent
Rose

(10) Patent No.: US 7,308,405 B2
(45) Date of Patent: Dec. 11, 2007

(54) BIOS WHICH TRANSLATES PRE-BOOT DISPLAY INFORMATION INTO SERIAL DATA FOR PROVIDING SYNTHESIZED SPEECH OUTPUT BY DETECTED SPEECH SYNTHESIZER

(75) Inventor: Jeff Alan Rose, Manor, TX (US)

(73) Assignee: Dell Products L.P., Round Rock, TX (US)

( * ) Notice: Subject to any disclaimer, the term of this patent is extended or adjusted under 35 U.S.C. 154(b) by 993 days.

(21) Appl. No.: 09/915,131

(22) Filed: Jul. 25, 2001

(65) Prior Publication Data

US 2003/0023441 A1 Jan. 30, 2003

(51) Int. Cl.
G10L 13/00 (2006.01)
G10L 13/04 (2006.01)

(52) U.S. Cl. ............................ 704/260; 704/271

(58) Field of Classification Search ............ 704/258, 704/271, 270.1, 273, 274, 260
See application file for complete search history.

(56) References Cited

U.S. PATENT DOCUMENTS

| | | | |
|---|---|---|---|
| 5,306,152 A | | 4/1994 | Shimoda et al. |
| 6,369,706 B1 * | | 4/2002 | Anderson et al. ............ 713/323 |
| 6,560,702 B1 * | | 5/2003 | Gharda et al. ................. 713/2 |
| 6,732,159 B1 * | | 5/2004 | Levine et al. ................ 709/217 |
| 6,791,572 B1 * | | 9/2004 | Cloney et al. ................. 713/2 |
| 6,832,344 B2 * | | 12/2004 | Lin et al. ...................... 714/48 |
| 6,938,152 B2 * | | 8/2005 | Shin et al. ...................... 713/1 |
| 2002/0062437 A1 * | | 5/2002 | Shin et al. ...................... 713/2 |

OTHER PUBLICATIONS

Janina Sajka, "Speakup and Via Voice", Dec. 12, 2000.*
"Playing it by ear", Nov. 7, 2002.*
Gene Collins, "The Speakup User's Guide", Mar. 29, 2005.*
Ameer Almary, "Making Linux Accessible for the Visually Impaired with Speakup", Oct. 31, 2005.*

* cited by examiner

Primary Examiner—Tālivaldis Ivars Šmits
(74) Attorney, Agent, or Firm—Haynes and Boone, LLP

(57) ABSTRACT

A system that includes a speech synthesizer and a computer system that includes a basic input output system (BIOS). The BIOS is configured to cause the computer system to translate pre-boot display information, in response to detecting the speech synthesizer, so as to provide one or more serial data signals associated with the information to the speech synthesizer. The speech synthesizer is configured to generate one or more audible outputs associated with the information in response to receiving the one or more signals.

23 Claims, 3 Drawing Sheets

BIOS WHICH TRANSLATES PRE-BOOT DISPLAY INFORMATION INTO SERIAL DATA FOR PROVIDING SYNTHESIZED SPEECH OUTPUT BY DETECTED SPEECH SYNTHESIZER

BACKGROUND

The disclosures herein relate generally to computer systems and more particularly to a system and method for providing audible outputs in a pre-boot environment in a computer system.

Computer systems do not typically provide visually impaired computer users with an audible output to enable the users to determine what is being printed on a display of a computer system prior to an operating system loading. Accordingly, visually impaired computer users may have a difficult time diagnosing failures and changing system configurations in computer systems. In addition, providing technical support to a visually impaired computer user whose computer system will not boot provides some unique challenges for a manufacturer or a vendor of the computer system. Similarly, visually impaired employees may be reliant on other personnel in a workplace environment when their computer systems will not boot.

It would be desirable to provide visually impaired computer users with an ability to diagnose failures and change a system configuration of a computer system in a pre-boot environment. Accordingly, what is needed is a system and method for providing audible outputs in a pre-boot environment in a computer system.

SUMMARY

One embodiment, accordingly, provides a system that includes a speech synthesizer and a computer system that includes a basic input output system (BIOS). The BIOS is configured to cause the computer system to display information and, in response to detecting the speech synthesizer, cause the computer system to provide one or more signals associated with the information to the speech synthesizer. The speech synthesizer is configured to generate one or more audible outputs associated with the information in response to receiving the one or more signals.

A principal advantage of this embodiment is that various shortcomings of previous techniques are overcome. For example, the embodiment provides a visually impaired computer user with an ability to diagnose failures and change a system configuration of a computer system in a pre-boot environment.

DETAILED DESCRIPTION

Figure 1:
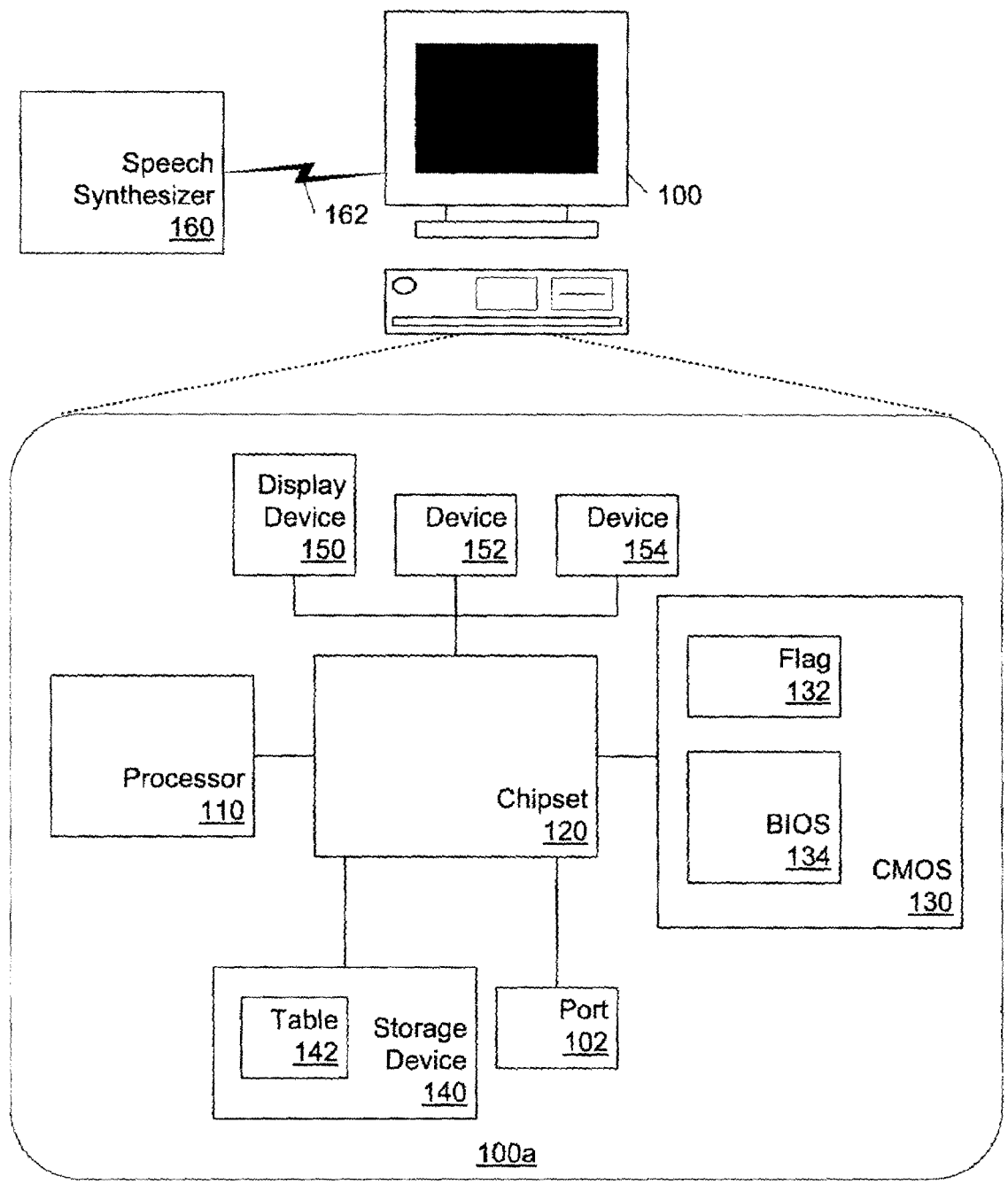
FIG. 1 is a diagram illustrating an embodiment of a system for providing audible outputs in a pre-boot environment in a computer system.

FIG. 1 is a diagram illustrating an embodiment of a system for providing audible outputs in a pre-boot environment in a computer system 100. Computer system 100 is configured to operate in conjunction with a speech synthesizer 160. Speech synthesizer 160 may be coupled to a port of computer system 100, such as a serial port, a parallel port, a Universal Serial Bus (USB) port, or a wireless port, which may be included in computer system 100 as a component of computer system 100, which may be included in a component of computer system 100 such as a sound card or other audio device, or which may be configured to remotely communicate with computer system 100 such as by using a wireless communications device or a network device.

As shown by a box 100a, computer system 100 includes a port 102, a processor 110, a chipset 120, a CMOS 130 or another non-volatile storage device (not shown), a storage device 140, a display device 150, and a plurality of other devices 152 and 154. CMOS 130 includes a flag 132 and a basic input output system (BIOS) 134. Storage device 140 includes a table 142.

Computer system 100 is configured to cause speech synthesizer 160 to generate audible outputs associated with one or more screens generated by BIOS 134 in a pre-boot environment. As used herein, the term pre-boot environment refers to the period of time where computer system 100 is controlled by BIOS 134 or another system firmware (not shown). BIOS 134 typically controls computer system 100 subsequent to computer system 100 being powered up and/or reset and prior to an operating system (not shown) taking control of computer system 100.

In response to computer system 100 being powered up or reset, BIOS 134 is initiated and causes computer system 100 to perform various initialization functions. These initialization functions include initializing hardware and software components of computer system 100 as well as performing various tests to diagnose any failures of hardware or software components of computer system 100. One example of a set of diagnostic tests performed by BIOS 134 is a Power On Self Test (POST). After performing the initialization functions, BIOS 134 causes an operating system (not shown) to be initiated. The operating system takes control of computer system 100 subsequent to being initiated.

Basic problems or errors associated with computer system 100 may be detected by BIOS 134, particularly during POST. These problems or errors may make computer system 100 inoperable or may require attention on the part of a user of computer system 100. In order to provide a visually impaired computer user with an ability to diagnose failures and change a system configuration of computer system 100, computer system 100 is configured to provide an audible output to enable a visually impaired user to determine what is being shown on display device 150 of computer system 100 in the pre-boot environment. To provide the audible outputs, computer system 100 provides signals associated with information provided to display device 150 and to speech synthesizer 160. Speech synthesizer 160 generates audible outputs associated with the signals to inform a user of computer system 100 of the information that is visually displayed on display device 150.

In the embodiment shown in FIG. 1, BIOS 134 causes computer system 100 to display information on display device 150. The information includes configuration information associated with computer system 100 as well as the results of diagnostic tests performed by BIOS 134. BIOS 134 also causes computer system 100 to detect the presence of speech synthesizer 160. In other embodiments, the functions described herein as being performed in response to BIOS 134 may be performed in response to a system firmware or a module separate from but accessible by BIOS 134 or a system firmware.

The presence of speech synthesizer 160 may be detected by BIOS 134 in various ways. For example, BIOS 134 may detect the presence of speech synthesizer 160 on a port of computer system 100 such as port 102 subsequent to initializing the port. As noted above, port 102 may be a serial port, a parallel port, a USB port, or a wireless port. BIOS may also detect the presence of speech synthesizer 160 by detecting a predefined value stored in flag 132 or in another memory location on or accessible by computer system 100. Further, BIOS 134 may detect the presence of speech synthesizer 160 in response to a signal or communication received from speech synthesizer 160.

In response to detecting the presence of speech synthesizer 160, BIOS 134 causes flag 132 to be set to a predetermined value. Accordingly, BIOS 134 may detect the presence of speech synthesizer 160 using flag 132 on a subsequent boot of computer system 100. Flag 132 may also be set to a predefined value indicating the presence of speech synthesizer 160 by a manufacturer or vendor of computer system 100 prior to being provided to a customer. In particular, the manufacturer or vendor may set flag 132 to the predefined value in response to a request from a customer who is visually impaired.

Subsequent to detecting the presence of speech synthesizer 160, BIOS 134 causes signals associated with the information displayed on display device 150 to be provided to speech synthesizer 160. In the embodiment shown in FIG. 1, BIOS 134 uses table 142 to translate the information displayed on display device 150 into the signals provided to speech synthesizer 160. Table 142 includes a plurality of strings and a plurality of codes. The display information is associated with one or more of the plurality of strings. BIOS 134 causes one or more of the plurality of codes associated with this one or more plurality of strings to be provided to speech synthesizer 160 subsequent to initializing table 142. Speech synthesizer 160 generates the audible outputs associated with the display information in response to receiving the one or more of the plurality of codes. The one or more of the plurality of codes are one possible signal provided by computer system 100 to speech synthesizer 160. Other types of signals are possible and contemplated. In one particular embodiment, table 142 is a Speech Synthesis Interface Library table that includes strings and codes as defined by the Speech Synthesis Interface Library.

The audible outputs generated by speech synthesizer 160 may include sounds associated with a spoken language such as English, French, or Chinese. The audible outputs may also include sounds associated with particular tones or volumes to convey information in the form of audible codes recognizable by a user of computer system 100.

In another embodiment, table 142 is replaced with a speech synthesis module (not shown) stored in storage device 140. The speech synthesis module translates the display information provided by BIOS 134 into signals to be provided to speech synthesizer 160. Alternatively, the speech synthesis module translates the display information provided by BIOS 134 into audio signals that may be provided by an audio output device (not shown) such as speakers or headphones without the need for speech synthesizer 160.

Figure 2:
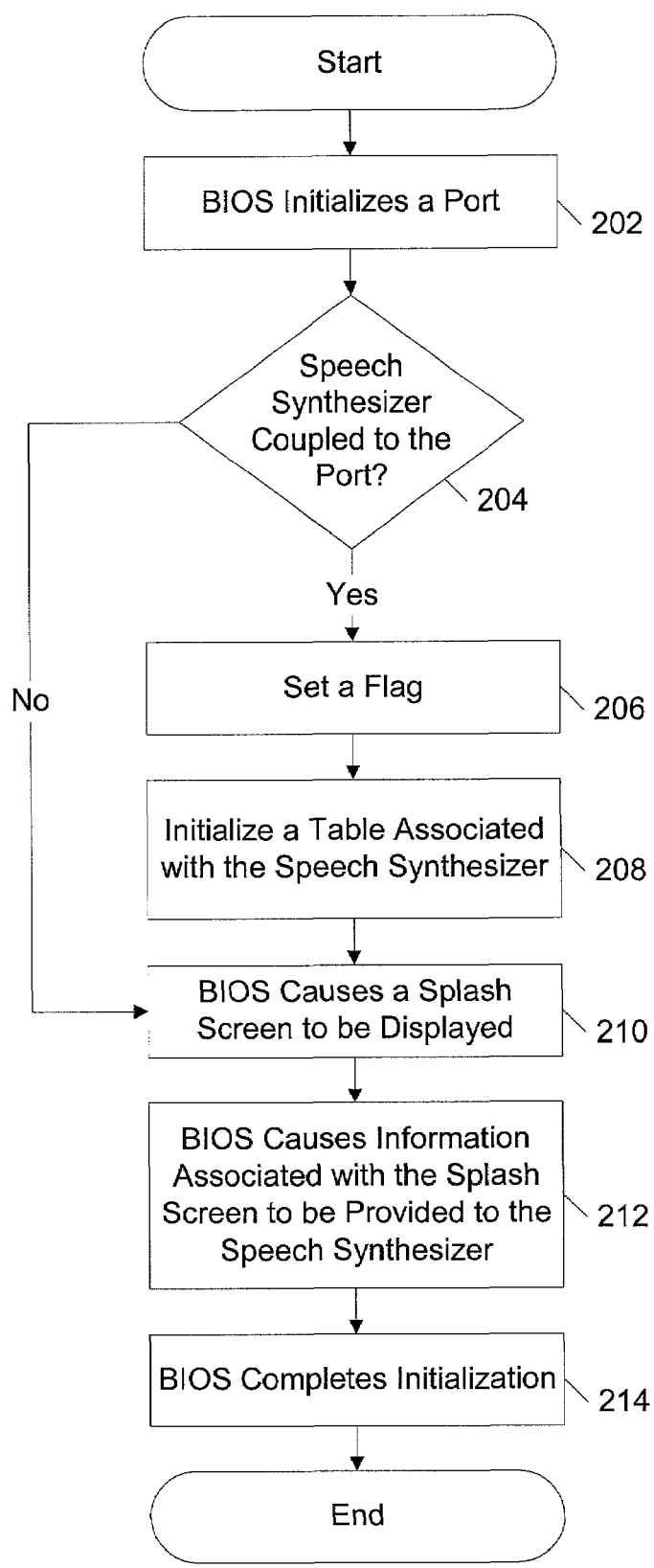
FIG. 2 is a flow chart illustrating an embodiment of a portion of a method for providing audible outputs in a pre-boot environment in a computer system.

FIG. 2 is a flow chart illustrating an embodiment of a portion of a method for providing audible outputs in a pre-boot environment in a computer system. In FIG. 2, a BIOS initializes a port as indicated in step 202. A determination is made as to whether a speech synthesizer is coupled to the port as indicated in step 204. If the speech synthesizer is not coupled to the port, then the method continues at step 210 as described below.

If the speech synthesizer is coupled to the port, then a flag is set as indicated in step 206. A table associated with the speech synthesizer is initialized as indicated in step 208. The BIOS causes a splash screen to be displayed as indicated in step 210. The BIOS causes information associated with the splash screen to be provided to the speech synthesizer, if present, as indicated in step 212. The BIOS completes initialization of the computer system as indicated in step 214.

Figure 3:
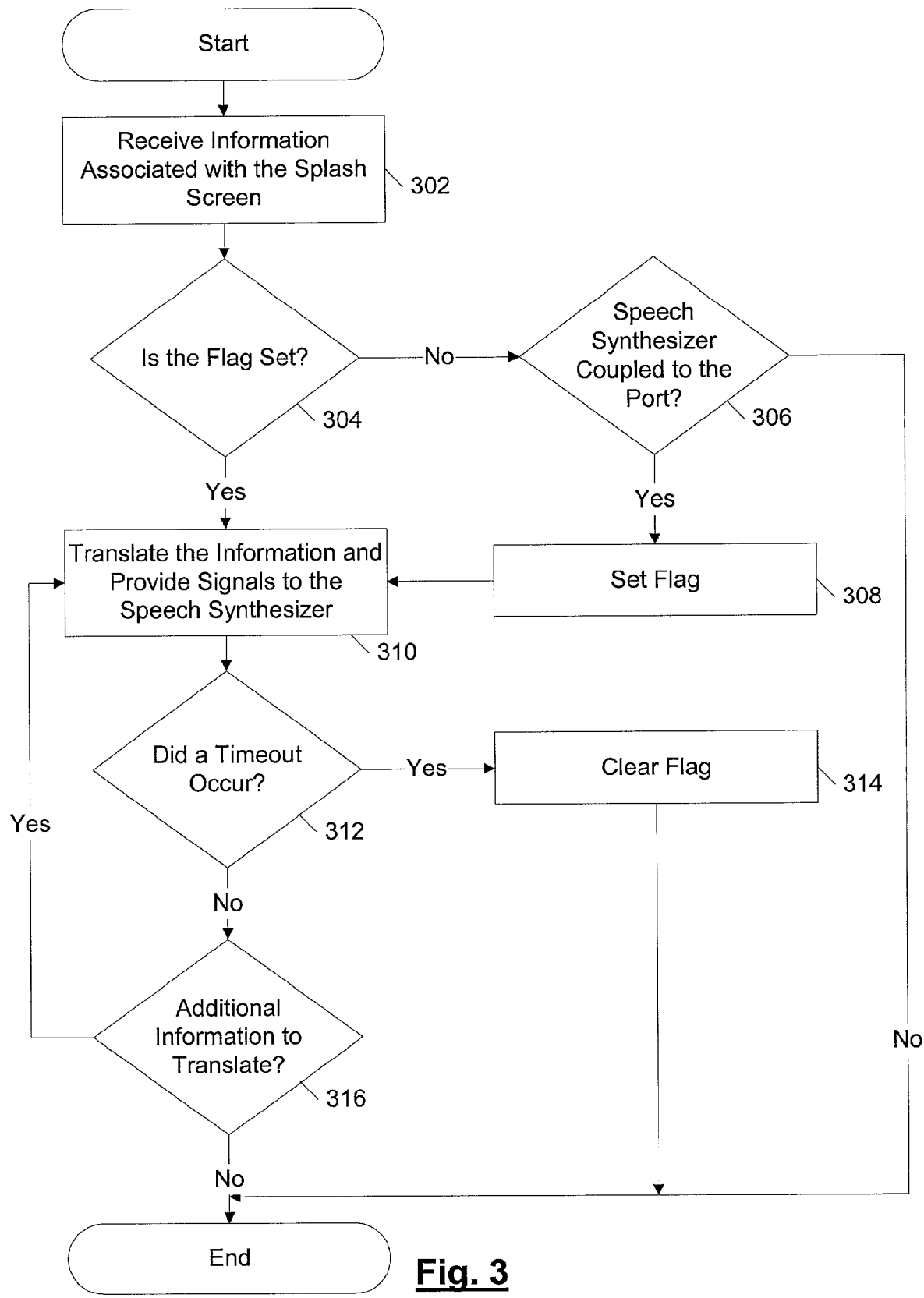
FIG. 3 is a flow chart illustrating an embodiment of a portion of a method for providing audible outputs in a pre-boot environment in a computer system.

FIG. 3 is a flow chart illustrating an embodiment of a portion of a method for providing audible outputs in a pre-boot environment in a computer system. Information associated with the splash screen is received as indicated in step 302. A determination is made as to whether the flag is set as indicated in step 304. If the flag is set, then the method continues at step 310 as described below. If the flag is not set, then a determination is made as to whether a speech synthesizer is coupled to the port as indicated in step 306. If the speech synthesizer is not coupled to the port, then the method ends as indicated. If the speech synthesizer is coupled to the port, then the flag is set as indicated in step 308.

The information is translated and signals associated with the translated information are provided to the speech synthesizer as indicated in step 310. A determination is made as to whether a timeout occurred as indicated in step 312. If a timeout occurred, then the flag is cleared as indicated in step 314 and the method concludes. If a timeout did not occur, then a determination is made as to whether there is additional information to translate as indicated in step 326. If there is additional information to translate, then the method returns to step 310. If there is not additional information to translate, then the method concludes as shown.

As can be seen, the principal advantages of these embodiments are that various shortcomings of previous techniques are overcome. For example, the embodiment provides a visually impaired computer user with an ability to diagnose failures and change a system configuration of a computer system in a pre-boot environment.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system comprising:
   a serial speech synthesizer; and
   a computer system including a basic input output system (BIOS) configured to provide a translation from display information to a data pattern output via a serial port in the system for generating an audible output, wherein in response to detecting the speech synthesizer, the BIOS translates the information to a data pattern, which data pattern is provided to the speech synthesizer;
   the speech synthesizer coupled to the serial port and configured to reproduce the data pattern with the audible output.

2. The system of claim 1, wherein the computer system includes a memory location, and wherein the BIOS is configured to cause the computer system to store a predefined value in the memory location in response to detecting the speech synthesizer.

3. The system of claim 1, wherein the computer system includes a memory location, and wherein the BIOS is configured to detect the speech synthesizer by detecting a predefined value stored in the memory location.

4. The system of claim 1, wherein the computer system includes a table that includes a plurality of strings and a plurality of codes, wherein the information is associated with one or more of the plurality of strings, and wherein the BIOS causes one or more of the plurality of codes associated with the one or more plurality of strings to be provided to the speech synthesizer.

5. The system of claim 1, wherein the computer system includes a Speech Synthesis Interface Library table.

6. The system of claim 1, wherein the computer system includes a speech synthesis module configured to convert the information into the signals.

7. The system of claim 1, wherein the computer system includes the speech synthesizer.

8. The system of claim 1, wherein the computer system includes a sound card, and wherein the sound card includes the speech synthesizer.

9. The system of claim 1, wherein the audible outputs include sounds associated with a spoken language.

10. A method performed by a computer system comprising:
including a basic input output system (BIOS);
displaying information associated with a pre-boot environment on a display associated with the computer system;
the BIOS translating the information to a data pattern output via a serial port in the system for generating an audible output; and
in response to detecting a serial speech synthesizer associated with the computer system and coupled to the serial port, providing the data pattern from the BIOS to the speech synthesizer, the speech synthesizer reproducing the pattern with one or more audible outputs associated with the information.

11. The method of claim 10, further comprising:
in response to detecting the speech synthesizer, providing one or more signals associated with the information to the speech synthesizer; and
generating the one or more audible outputs in response to the one or more signals.

12. The method of claim 10, further comprising:
storing a predefined value in a memory location on the computer system in response to detecting the speech synthesizer.

13. The method of claim 10, further comprising:
detecting the speech synthesizer by detecting a predefined value in a memory location on the computer system.

14. The method of claim 10, further comprising:
in response to detecting the speech synthesizer, generating the one or more audible outputs using a table stored on the computer system.

15. The method of claim 10, further comprising:
in response to detecting the speech synthesizer, generating the one or more audible outputs using a Speech Synthesis Interface Library table stored on the computer system.

16. The method of claim 10, further comprising:
in response to detecting the speech synthesizer, generating the one or more audible outputs using a speech synthesis module stored on the computer system.

17. A system comprising:
a computer system including a basic input output system (BIOS) for:
displaying information associated with a pre-boot environment on a display associated with the computer system wherein the BIOS translates the information to a data pattern to be output via a serial port in the system for generating an audible output; and
in response to detecting a serial speech synthesizer associated with the computer system and coupled to the serial port, providing the data pattern from the BIOS to the speech synthesizer, the speech synthesizer reproducing the pattern with one or more audible outputs associated with the information and without requiring optical scanning.

18. The system of claim 17, wherein the computer system is for:
in response to detecting the speech synthesizer, providing one or more signals associated with the information to the speech synthesizer; and generating the one or more audible outputs in response to the one or more signals.

19. The system of claim 17, wherein the computer system is for:
storing a predefined value in a memory location on the computer system in response to detecting the speech synthesizer.

20. The system of claim 17, wherein the computer system is for:
detecting the speech synthesizer by detecting a predefined value in a memory location on the computer system.

21. The system of claim 17, wherein the computer system is for:
in response to detecting the speech synthesizer, generating the one or more audible outputs using a table stored on the computer system.

22. The system of claim 17, wherein the computer system is for:
in response to detecting the speech synthesizer, generating the one or more audible outputs using a Speech Synthesis Interface Library table stored on the computer system.

23. The system of claim 17, wherein the computer system is for:
in response to detecting the speech synthesizer, generating the one or more audible outputs using a speech synthesis module stored on the computer system.

* * * * *